July 4, 1933.   D. A. CARLSON   1,916,752
INSULATED CABINET OR RECEPTACLE
Filed Aug. 18, 1931   3 Sheets-Sheet 1
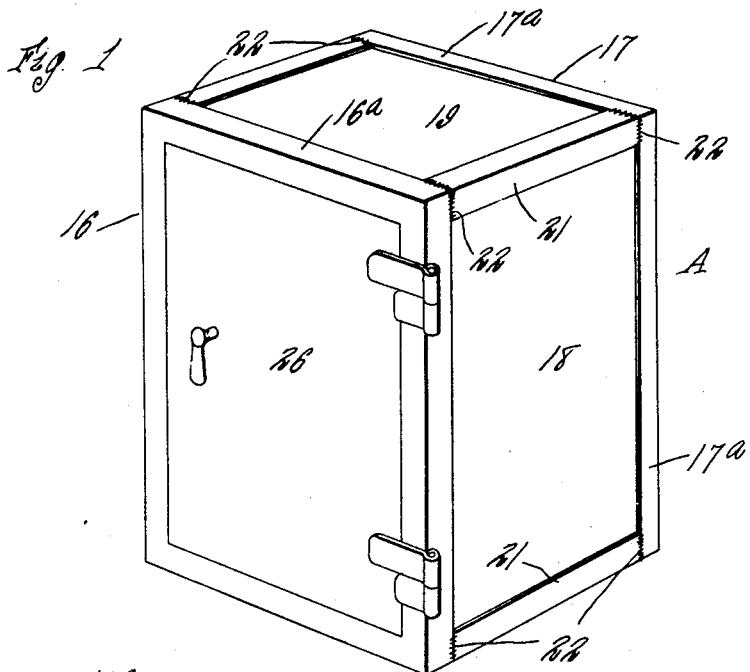
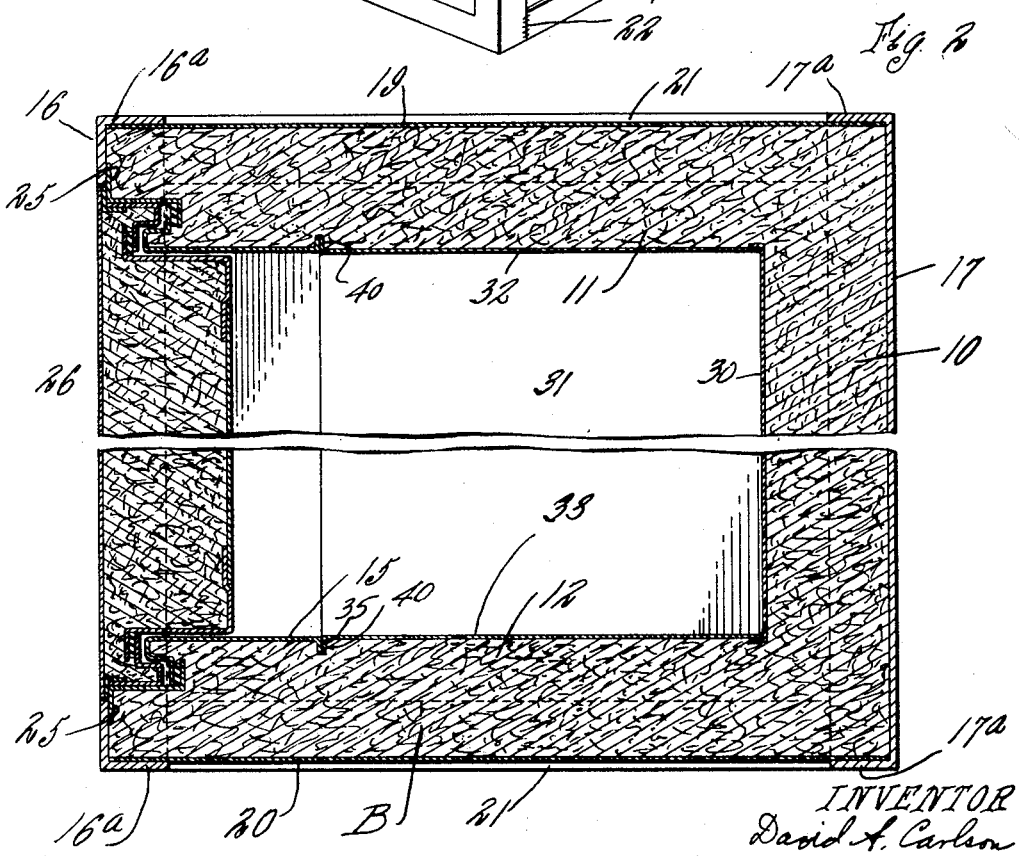

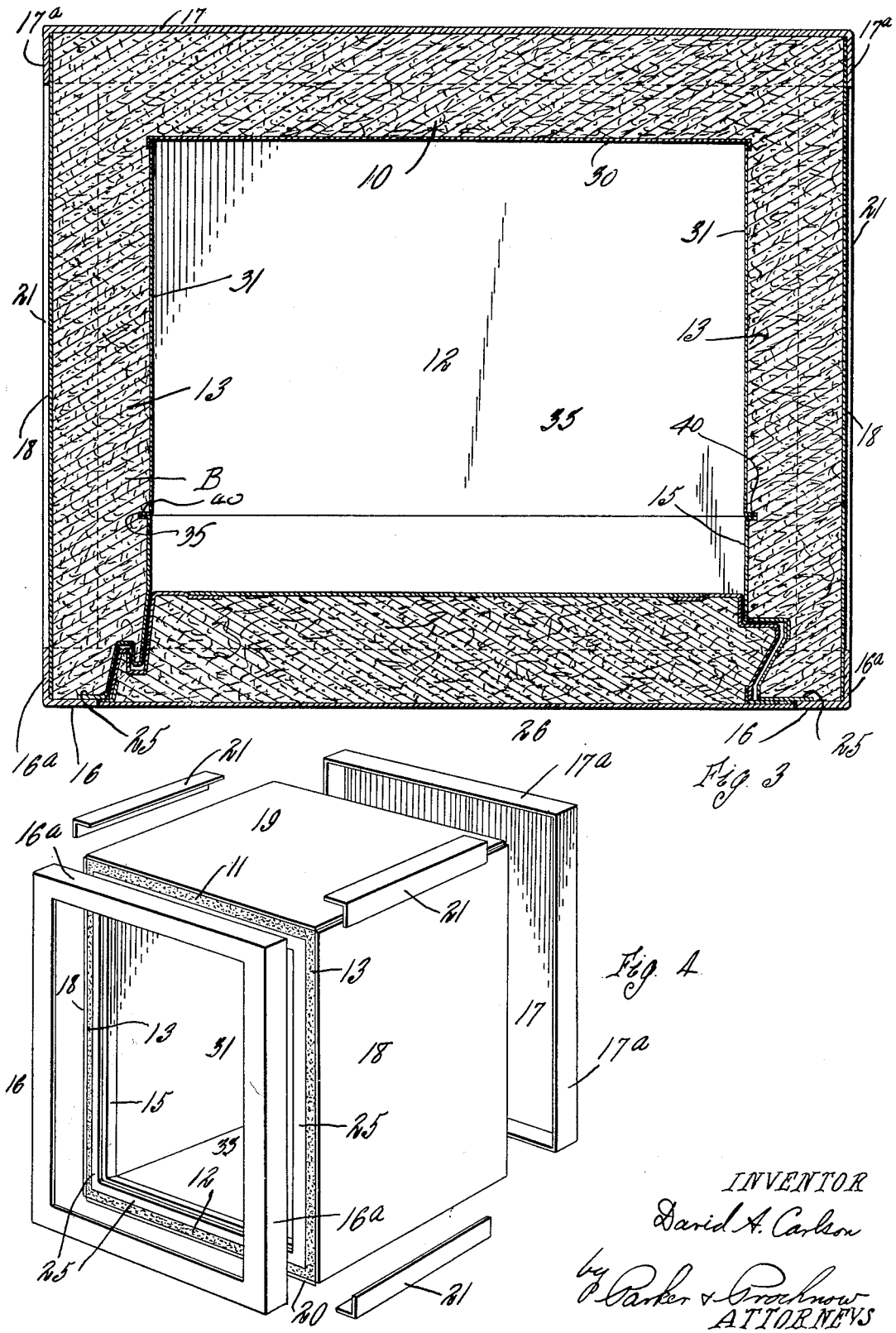

July 4, 1933.   D. A. CARLSON   1,916,752
INSULATED CABINET OR RECEPTACLE
Filed Aug. 18, 1931   3 Sheets-Sheet 3

INVENTOR.
David A. Carlson
by Parker & Pinelnow
ATTORNEYS.

Patented July 4, 1933

1,916,752

UNITED STATES PATENT OFFICE

DAVID A. CARLSON, OF JAMESTOWN, NEW YORK, ASSIGNOR TO ART METAL CONSTRUCTION COMPANY, OF JAMESTOWN, NEW YORK

INSULATED CABINET OR RECEPTACLE

Application filed August 18, 1931. Serial No. 557,774.

This invention relates to safes, cabinets or analogous cases or receptacles and particularly to those which comprise a metal shell or casing and an enclosed or contained lining or body of insulating material suitable for insulating or protecting the contents of the receptacle, as for instance, from the effects of heat or fire.

One object of the invention is to produce a practical and desirable cabinet or receptacle of improved construction which can be produced expeditiously and economically.

Other objects of the invention are to produce a fire-resisting cabinet or receptacle of improved construction in which the liability of warping or distortion of the device is reduced to the minimum; which has an outer metal shell of improved construction; which has an inner metal shell or lining of improved construction; and also to produce a cabinet or analogous receptacle of a construction which has the features of advantage and improvement hereinafter described and set forth in the claims.

In the accompanying drawings:

Fig. 1 is a perspective view of a cabinet or the like embodying my invention.

Fig. 2 is a sectional elevation thereof on an enlarged scale.

Fig. 3 is a sectional plan view thereof on the same scale as Fig. 2.

Fig. 4 is a perspective view on a reduced scale, showing the several parts of the outer metal shell disposed about the insulating lining, but disconnected.

Figure 5:
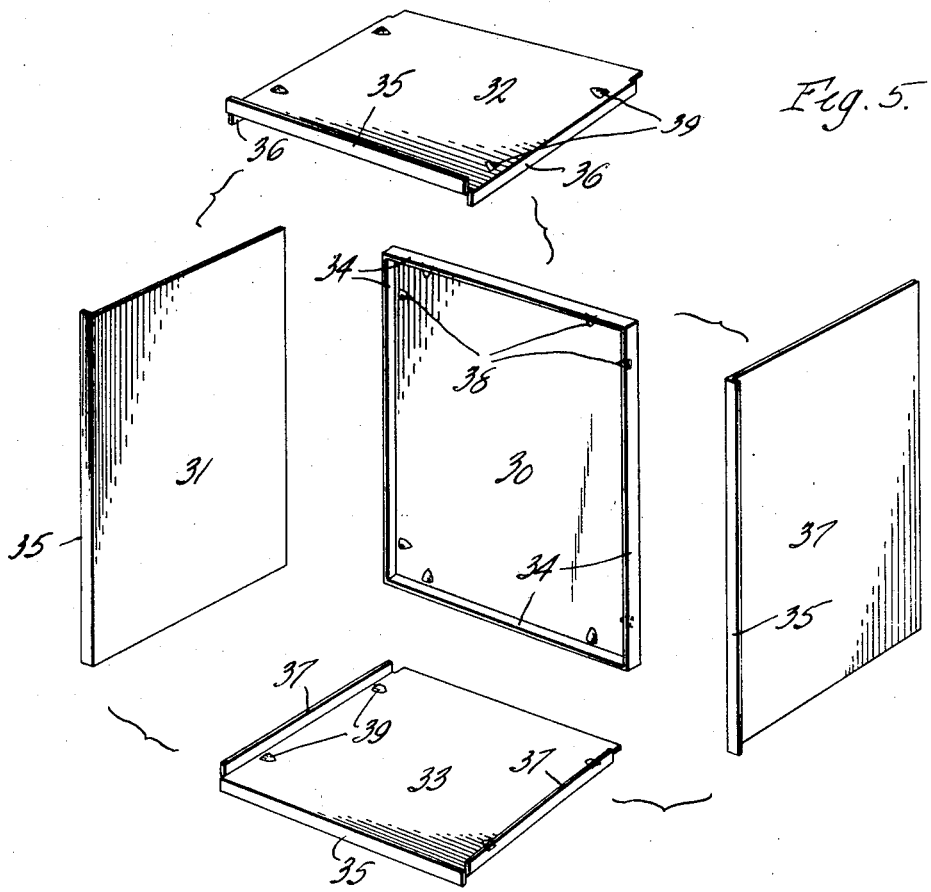
Fig. 5 is a perspective view showing the several component parts of the inner metal shell disconnected.
Figure 6:
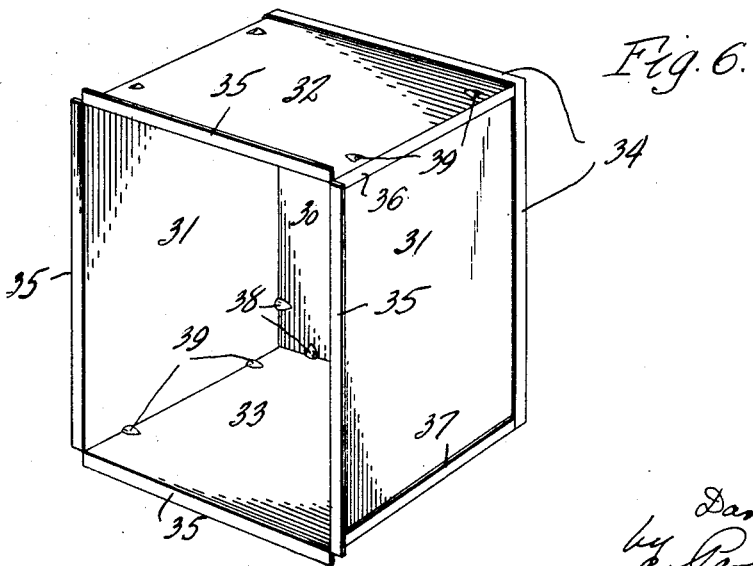
Fig. 6 is a perspective view of the inner metal shell complete, but removed from the cabinet.

The safe or receptacle shown in the drawings has an external metal shell or casing A, shown in Fig. 1, within which the lining or body B of insulating material is enclosed or contained and protected. It may also have, and is shown in the drawings as having, an inner sheet metal shell C which covers and protects the insulating material interiorly, and provides a metal walled chamber for the reception of articles.

The insulating lining may be of any suitable construction, but preferably consists of a hollow monolithic casting or single-piece body of suitable material. When the lining is intended for the purpose of protecting the contents of the receptacle from the effects of heat or fire, it may consist of a suitable fire-resisting composition, such as a mixture of plaster of Paris and asbestos fiber or other materials. The insulating lining shown consists of a hollow monolith or casting having a back wall 10 and top, bottom and side walls 11, 12 and 13 respectively, all adapted to be cast or formed in a suitable mold. In producing this insulating lining or body, a metal frame 15, which forms the door jambs or an open frame surrounding the door opening in the front of the insulating lining, may be placed in and form a part of the mold in which the insulating composition is cast or molded so that the composition surrounds and conforms to the jamb frame 15, and when the cast lining is removed from the mold, this door frame will be incorporated in or form an integral part of the monolithic casting.

The outer metal shell or casing is composed of separate parts comprising a front frame 16, a rear or back member 17, side wall plates 18, a top plate 19, bottom plate 20 and corner angles 21 which extend from the front frame to the back member at the four corners of the shell or casing. The front frame 16 is an open or skeleton frame having side, top and bottom bars of angle shape in cross section with inwardly extending marginal flanges 16a at the top, bottom and sides of the frame, as clearly shown in Figs. 1—3. The back member 17 is of shallow pan shape, preferably consisting of a sheet metal plate having integral, forwardly projecting, marginal flanges 17a at its top, bottom and side edges.

In assembling the parts of this shell or casing, the side plates 18 and top and bottom plates 19, 20, are laid or placed flat against the corresponding outer faces of the insulating lining as shown in Fig. 4, and the front frame 16 and back member 17 are then placed in position, with the rearwardly extending flanges of the former and the forwardly extending flanges of the latter surrounding and snugly fitting the front and rear edge portions of the side, top and bottom plates 18, 19 and 20. The corner angles 21 are then placed in position at the corners of the shell over the adjacent edge portions of the side, top and bottom plates and between the marginal flanges of the front frame and back member, with the ends of the corner angles abutting against the inner edges of the flanges 16a of the front frame and 17a of the back member, and the ends of the corner angles 21 are then rigidly attached, preferably by welding, to the flanges of the front frame and back member, as indicated at 22 in Fig. 1. These joints may be formed by arc welding or any other suitable welding method.

The front flanges of the front frame 16 of the shell overlap and bear against outwardly projecting marginal flanges 25 at the front edge of the door frame 15 and the forwardly and rearwardly projecting flanges of the front frame and back member overlap and bear respectively on the front and rear edges of the side, top and bottom plates of the shell or casing and confine and hold these plates in place, but preferably the front and rear frames are not welded or otherwise attached to the door frame 15 or the plates of the casing, and the welds 22 joining the ends of the corner angles to the flanges of the front frame and back member are the only permanent connections between the component parts of the metal shell or casing.

Thus, by constructing the metal shell or casing as described, the necessity for seaming together, joining or otherwise fastening or attaching the component parts of the metal shell or casing, except only at the corner welds 22, is eliminated. This materially reduces the time, labor and expense of constructing the shell or casing. Since the front frame 16 is not attached to the door frame 15 or to the plates which form the sides, top and bottom of the shell, and these plates are not attached to the back member 17, the shell or casing is less liable to be pulled out of shape or distorted in any way by the possible warping of any part thereof.

The cabinet or receptacle could be used as described without being finished interiorly with a metal shell or lining but preferably, it is provided with an inner metal shell C constructed as follows:

This inner metal shell is composed of back, side, top and bottom walls 30, 31, 32 and 33 respectively which are made of separate, detachably connected sheet metal plates. Preferably the back plate is made with forwardly projecting marginal flanges 34, and each of the other plates with an outwardly extending front edge flange 35, while the top and bottom plates are additionally formed respectively with downwardly extending side flanges 36 and upwardly extending side flanges 37.

In assembling these parts to form the inner shell, the back plate 30 is placed in position in the insulating lining against the back wall 10 thereof and the top and bottom plates 32 and 33 are placed in the insulating lining against the top and bottom walls respectively thereof with their rear edges against the back plate 30 and held between the flanges 34 of the latter and lugs or blisters 38 formed on the inner face of the back plate close to its edge flanges. The side plates 31 are then placed between the top and bottom plates and pressed outwardly against the side walls of the insulating body causing their edges to snap over lugs or blisters 39 on the inner sides of the top and bottom plates and be held between these blisters and the side flanges of the top and bottom plates. The inner faces of the insulating lining are preferably scored or formed with narrow grooves 40 to receive the front flanges 35 of the several plates of the inner shell. When thus assembled the parts of the inner shell will be held firmly and securely in place without the necessity of other fastening means.

As shown, the safe or receptacle is provided with a door 26 hinged to the front frame 16. This door may be of the usual or any suitable construction. The door and the door frame 15 in which it seats when closed, are shown as being provided with interfitting marginal tongues and grooves, in accordance with the usual practice in safe construction.

While the side, top and bottom casing plates 18, 19 and 20 are preferably separate or disconnected plates, as shown, the open ended metal sheath which they form and which surrounds the lining between the opposite or front and rear ends thereof could, if desired, be made in one, two or three pieces only by bending one or more metal sheets to form two or more sides of the casing.

I claim as my invention:

1. A receptacle comprising a lining of insulating material, and a metal casing enclosing said lining and comprising a front frame and a back plate having marginal flanges which extend toward each other, corner angles extending between and welded at their ends to the flanges of said front frame and back plate, and casing plates arranged against the outer faces of said lining with their edges extending under and confined by the flanges of the front frame, back plate and corner angles, the only rigid connections between the parts of said casing being the welded joints connecting the ends of the corner angles to said front frame and back plate.

2. A receptacle having an inner metal shell lining the receptacle and comprising separate disconnected wall plates, said wall plates having interfitting portions which cooperate to retain said plates releasably assembled within the receptacle, and certain of said plates abutting portions of the walls of said receptacle whereby said plates are retained in connection.

3. A receptacle having an inner metal shell lining the receptacle and comprising separate disconnected plates forming an end wall and the side walls of said shell, said end wall plate and the adjacent edges of said side wall plates having interfitting portions, and said side wall plates having portions at their adjacent edges which interfit with each other, said plates resting against the corresponding walls of the receptacle and flanges on said side wall plates which enter grooves in the walls of the receptacle, whereby said wall plates are secured in place.

4. A metal casing comprising opposite wall members having integral marginal flanges projecting towards each other from the peripheral edges of said members, corner angles extending between and welded at their ends to the flanges of said opposite wall members at the corners of the casing, and casing plates forming the remaining walls of the casing and having their edges extending under and confined by the flanges of the front and rear members and corner angles.

5. A receptacle comprising a lining of insulating material, and a metal casing enclosing said lining and comprising opposite wall members having integral marginal flanges projecting towards each other from the peripheral edges of said members, corner angles extending between and permanently attached to their ends to the flanges of the said opposite members at the corners of the casing, and casing plates arranged against the outer faces of the insulating lining between said opposite members, said plates being disconnected from but having their edges extending under and confined by the flanges of the front and rear members and corner angles.

6. A receptacle comprising an insulating lining, a door jamb frame at the front end of said lining, and a metal casing enclosing said lining and comprising casing plates arranged against the side faces of said lining, a front frame and a rear plate having integral marginal flanges projecting towards each other from the peripheral edges of said front frame and rear plate respectively and overlapping and confining the opposite ends of said casing plates, and corner angles extending from front to rear at the corners of the casing and confining the side edges of said casing plates and welded at their ends to the flanges of the front frame and rear plate, said front frame, rear plate and corner angles being disconnected from said casing plates and from said jamb frame.

7. A receptacle comprising an insulating lining, and a metal casing enclosing said lining and comprising an open ended sheath surrounding the lining between its opposite ends, and end members at said opposite ends of the lining having integral flanges extending towards each other outside of and confining the opposite ends of said sheath, and corner angles extending from one to the other of said end members outside of and confining the side corners of said sheath and welded at their opposite ends to the flanges of said end members, said welds between said corner angles and flanges of said end members being the only rigid joints between said parts forming the metal casing.

DAVID A. CARLSON.